July 19, 1955

J. H. SCOTT ET AL 2,713,677

METHOD AND APPARATUS FOR DISCRIMINATING
FREQUENCY MODULATED RECORDS

Filed Aug. 3, 1954

INVENTORS:
James H. Scott
James W. Valentine
William Gross

BY

July 19, 1955

J. H. SCOTT ET AL 2,713,677

METHOD AND APPARATUS FOR DISCRIMINATING
FREQUENCY MODULATED RECORDS

Filed Aug. 3, 1954

INVENTORS:

James H. Scott
James W. Valentine
William Gross

BY

July 19, 1955   J. H. SCOTT ET AL   2,713,677
METHOD AND APPARATUS FOR DISCRIMINATING
FREQUENCY MODULATED RECORDS
Filed Aug. 3, 1954   6 Sheets-Sheet 5 a                               b a                               b

INVENTORS:
James H. Scott
James W. Valentine
William Gross

BY
*Roland A. Anderson*
*Attorney*

July 19, 1955   J. H. SCOTT ET AL   2,713,677
METHOD AND APPARATUS FOR DISCRIMINATING
FREQUENCY MODULATED RECORDS
Filed Aug. 3, 1954                        6 Sheets-Sheet 6 a                          b a                          b

INVENTORS:
James H. Scott
James W. Valentine
William Gross

BY
*Roland A. Anderson*
*Attorney*

United States Patent Office 2,713,677
Patented July 19, 1955

2,713,677

METHOD AND APPARATUS FOR DISCRIMINATING FREQUENCY MODULATED RECORDS

James H. Scott and James W. Valentine, Albuquerque, N. Mex., and William Gross, San Diego, Calif., assignors, by mesne assignments, to the United States of America as represented by the United States Atomic Energy Commission Application August 3, 1954, Serial No. 447,693

3 Claims. (Cl. 340—174)

This invention relates to an improved method and system of apparatus for the elimination of the effects of speed variations of the recording medium in the discrimination of frequency modulated records and permits the information thereon recorded to be derived without contamination by "wow" and "flutter." Such variations in recording and reproducing speed are generally referred to as "wow" when of low frequency and as "flutter" when of higher frequency. They give rise to corresponding amplitude modulation in the demodulated electrical signals finally derived.

In the case of sound film reproduction, for example, wow and flutter are caused by angular speed variation of the recording or reproducing sprockets and by irregularities in the contact of the film perforations with the sprocket teeth. In the case of records on magnetic tape, eccentricity in the capstan of the recording or reproducing machine is a prominent cause of variation in linear speed of the tape. The exemplary embodiment of the invention to be described in what follows relates particularly to the recording and reproduction of magnetic tape records of telemetering information recorded on the tap by the method of frequency modulation. It will be clear that other record media than magnetic tape can be used, and in their recording and reproduction the invention is equally useful.

A general object of the invention is therefore to provide an improved method and apparatus for the discrimination of frequency modulated records.

The efforts of the prior art have been devoted to mechanical improvements in the equipment driving the record in recording or reproducing. Complicated and expensive devices have been proposed, which to some extent avoid the appearance of wow and flutter. By the use of the present invention such elaborate recording equipment is made unnecessary.

It is thus another object of the invention to provide method and means for deriving information uncontaminated by wow and flutter from records of the kind described requiring nothing but inexpensive recording equipment for the record itself.

In a prior-art system an eddy current brake controlled in accordance with speed variation of the reproducing mechanism is used to slow down or speed up that mechanism but with a necessary time lag. In the present invention no interference with the functioning of the reproducing mechanism is required.

Thus another object of the invention is to provide a method and apparatus for successfully treating the reproduction of a frequency modulated record on magnetic tape, for example, without in any way modifying the operation of the reproducer.

The method and apparatus of the present invention permits, in theory, complete elimination of a wow and flutter components and, in practice, does so at the cost of a low "noise" level in the most unfavorable circumstances.

Another object of the invention is accordingly to provide an apparatus and a method which permit theoretically complete elimination of wow and flutter from the reproduction of a frequency modulated record.

The invention makes use of conventional apparatus elements in a novel combination, and the avoidance of unfamiliar devices is a feature of the invention.

How the above objects are obtained, with others which will be later apparent, will be clear from the following description of an illustrative embodiment of the invention, read with reference to the following figures, in all of which like elements are designated by like numerals and in which:

Fig. 1 shows a block schematic of the apparatus now in common use for reproducing frequency modulated records, together with curves illustrative of the operation of each element of the schematic;

Fig. 2 exhibits in *a* diagramatically the present invention and in *b* the production of the noise level which may be incident to the simple form of the invention;

Figure 4:
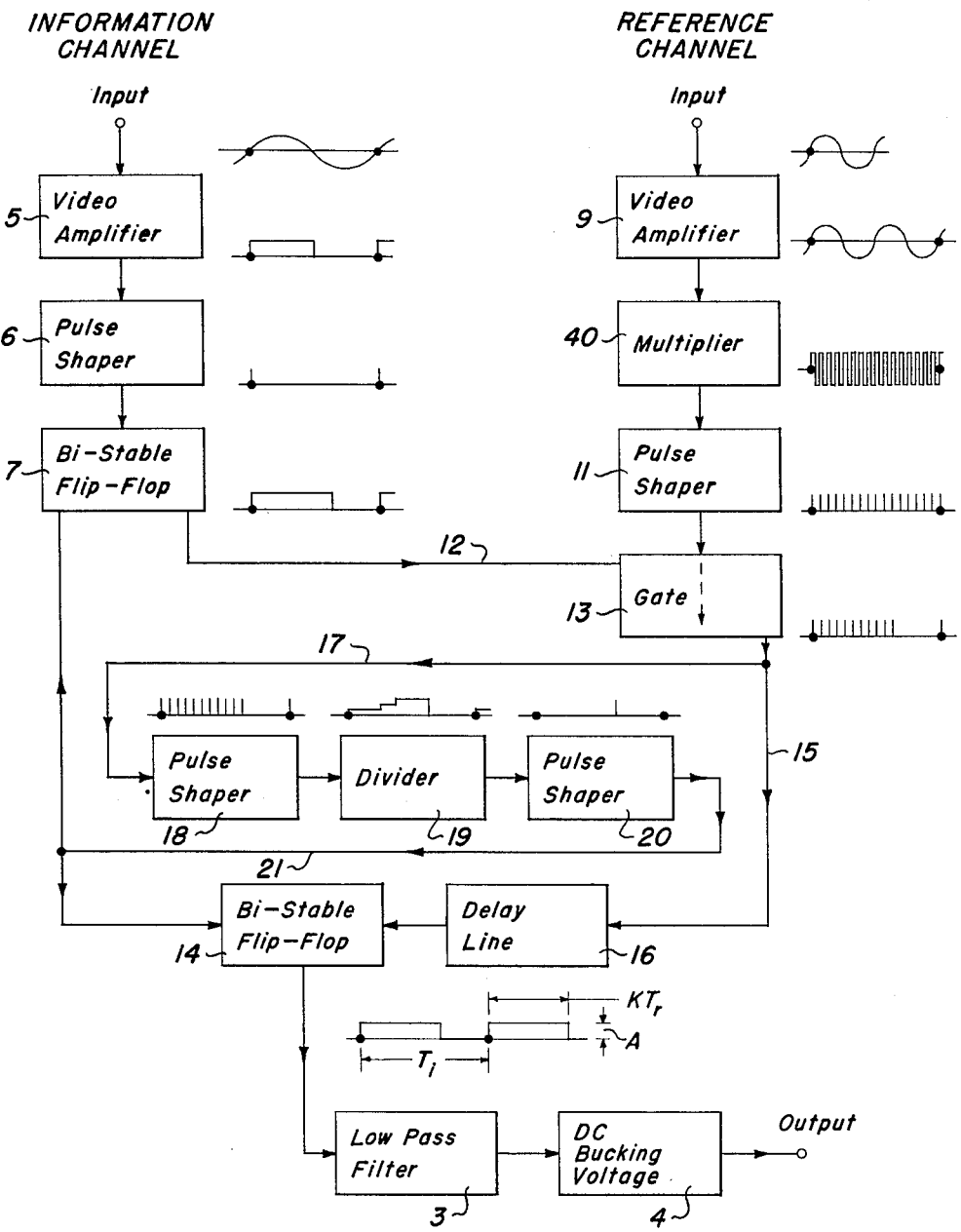
Fig. 4 is a block schematic of an apparatus somewhat more elaborate than that of Fig. 3 which is used to provide a reproduction with an acceptably low noise level.
Figure 5:
Fig. 5 illustrates the use of the invention in eliminating wow and flutter from a frequency record modulated at 20 cycles per second by deliberately introduced mechanical modulation, the recorded center frequency being 22 kilocycles per second.
Figure 6:
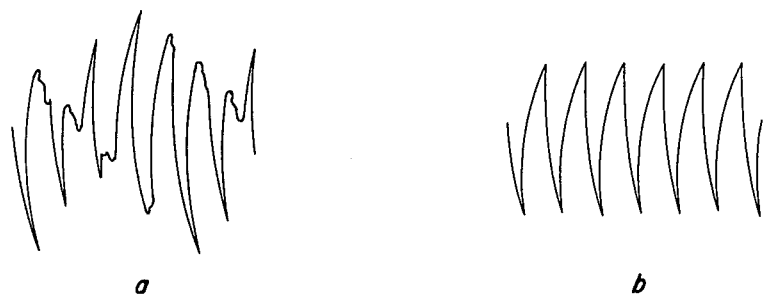
Fig. 6 illustrates the success of the invention in dealing with the frequency modulated record as in Fig. 5, on which a sawtooth signal (center frequency 22 kilocycles) has been recorded, also affected by 20 cycles per second wow.
Figure 7:
Figure 8:
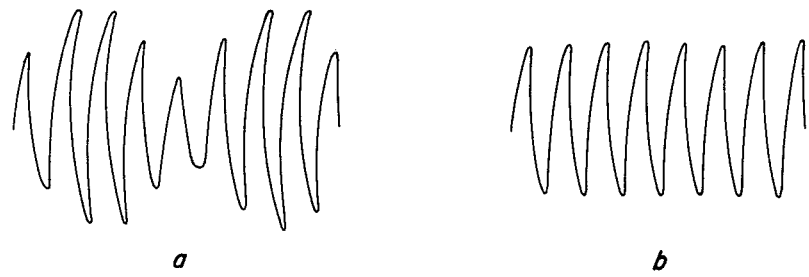
Figure 9:
Figure 10:

Figs. 7 and 8 illustrate respectively results like those shown in Figs. 5 and 6, where the recorded center frequency is 0.96 kilocycle per second; and Figs. 9 and 10 illustrate successful dealing with wow and flutter, of 500 and 25 cycles per second respectively, electrically introduced into the system of Fig. 4.

Figure 1:
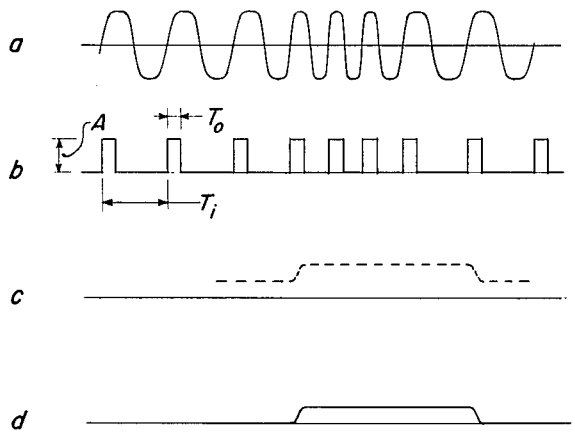

Referring first to Fig. 1, the hitherto customary system for deriving recorded information from a frequency modulated record uses amplifier 1 to which is applied a reproduced voltage of $f_c \pm \Delta f$, where $f_c$ is the center frequency which is modulated by known means to vary between $f_c + \Delta f$ and $f_c - \Delta f$, where $\Delta f$ is the frequency variation which represents the information to be recorded and is customarily less than 20% of $f_c$.

The output of *a* of amplifier 1 represented by curve *a* is a curve of voltage of the center frequency whose oscillations are crowded together in the center of the diagram to symbolize an increased frequency corresponding to $f_c + \Delta f$. In the graph the central frequency and its variations are greatly exaggerated in respect to time, which here and elsewhere in the figures increases from left to right.

This output is applied to cross-over area generator 2 by which a constant area pulse is produced at each positive-going crossover of curve *a*. The voltage amplitude A of each pulse is set by known means and T₀; the duration of each pulse is controlled by the circuit of generator 2 to be a constant. The product AT₀ may for convenience be termed an "area," and its time progression is exemplified by curve *b*, representing the voltage-time output of generator 2.

Low-pass filter 3, passing, say, 0 to 500 cycles per second, receives output *b* and averages the "area density" with respect to time, yielding as an output voltage the dashed curve *c* which exhibits a central elevated portion between constant level portions. The elevated portion represents the information $\Delta f$ and the constant level portions correspond to the unmodulated central frequency. This voltage, time averaged by filter 3, is applied to a source 4 of bucking D. C. voltage, from which the output, curve $d$, is obtained. The amplitude of the central portion of curve $d$ is proportional to $\Delta f$, which for simplicity is taken as a practically square-topped change in frequency of $f_c$.

Curve $d$ is assumed to correspond to a recording and reproduction uncontaminated by spurious frequency variation, a case not even partially exemplified by any but the most elaborate apparatus. It is clear that such spurious variation will vary the frequency with which generator 2 produces pulses and so will corrupt the result given by curve $d$.

Curve $c$ in Fig. 1 represents the product of the operation of filter 3 on the discrete areas supplied from generator 2, calling the area of an individual pulse $AT_0$ (actually voltage amplitude multiplied by duration). The averaged curve $c$ is:

$$\text{Average area} = \frac{AT_0}{T_i}$$

where $T_i$ is the interval between the beginnings of successive positive crossovers of curve $a$. This period is influenced by the frequency variation of the recorded wave brought about by the impressed information represented by $\Delta f$. Thus $$T_i = \frac{1}{f_c \pm \Delta f}$$

the nominal linear speed of the record being fixed. Accordingly, $\text{Average area} = AT_0(f_c \pm \Delta f)$ or
$= AT_0 f_c \pm AT_0 \Delta f.$ In the last expression $AT_0 f_c$ is a constant term eliminated by a bucking voltage from element 4, leaving $\pm AT_0 \Delta f \alpha$ recorded information. The system of Fig. 1 is commonly known as an average area discriminator.

The foregoing simple procedure suffices for a record devoid of undesired frequency variation. Such variation may be designated by X, which may be positive, negative or cyclic. In such case the frequency from the record is $(f_c \pm \Delta f)(1+X)$. The average area discriminator of Fig. 1 has in this case the output $$\frac{AT_0}{T_i'} \text{ where } T_i' = \frac{1}{(f_c \pm \Delta f)(1+X)}$$

This produces the average area, $\text{Average area} = AT_0(1+X)(f_c \pm \Delta f)$, or, finally,
$= AT_0 f_c \pm AT_0 \Delta f + AT_0 X(f_c \pm \Delta f).$ The output of filter 3 has therefore the same D. C. voltage $AT_0 f_c$ which is cancelled by the opposing voltage in block 4, but an amplitude error has been added to the desired term of the amount $AT_0 X(f_c \pm \Delta f)$.

This error is not wholly compensable by any hitherto known form of discriminator. The problem is solved in theory completely, in practice to a very close approximation, by the method of the present invention. This method calls for recording a fixed reference frequency at the same time as the frequency to be modulated in accordance with the desired information. The latter record will hereinafter be referred to as the "information" record.

The new discriminator used by the present invention causes at each positive-going crossover of the information voltage wave the production of a square-topped area of duration proportional to the period $T_r$ of the reference frequency. It will be understood that the amplitude of the area regulated by suitable adjustment of the bi-stable flip-flop generating the area and is made conveniently the same as the A of Fig. 1.

The average area now is recognized on the output of a filter identical with filter 3 of Fig. 1 and may be stated as $$\text{Average area} = \frac{AKT_r}{T_i}$$

where $AKT_r$ is dependent on period $T_r$, which is varying with the disturbing factor X, which experience shows usually to be less than a few per cent of the reference or of the information frequency.

Figure 2:
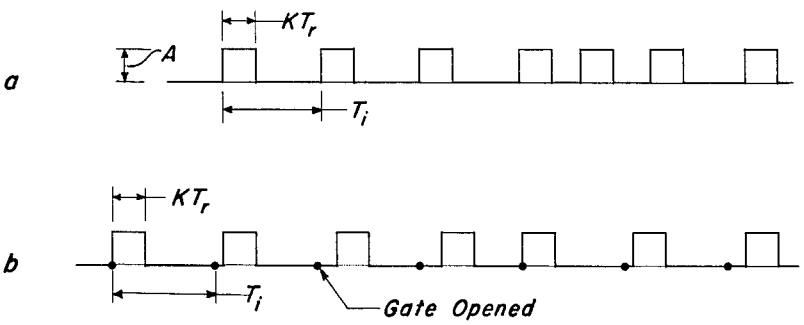

In Fig. 2, diagram $a$ illustratively exhibits the result obtained by the apparatus to be described in connection with Fig. 3. Square-topped areas are generated at each positive-going crossover of voltage $a$ of Fig. 1. The amplitude of the areas in Figs. 1 and 2 may be the same, but, whereas the duration of the areas in Fig. 1 is fixed, the duration of the areas in Fig. 2 is proportional to the period of the reference frequency recorded along with the information frequency. We now have $$\text{Average area} = \frac{AKT_r}{T_i}$$

where $T_r$, the period of the reference wave, is $$T_r = \frac{1}{f_r(1+X)}$$

and, as before, $$T_i = \frac{1}{(f_c \pm \Delta f)(1+X)}$$

the two frequencies being equally affected by the speed variation. Therefore $$\text{Average area} = \frac{AK(f_c \pm \Delta f)(1+X)}{f_r(1+X)}$$

or $$= \frac{AK(f_c \pm \Delta f)}{f_r}$$

and the damage done by the speed variation is completely compensated. This procedure is to be called a "division" method of wow and flutter compensation.

Figure 3:
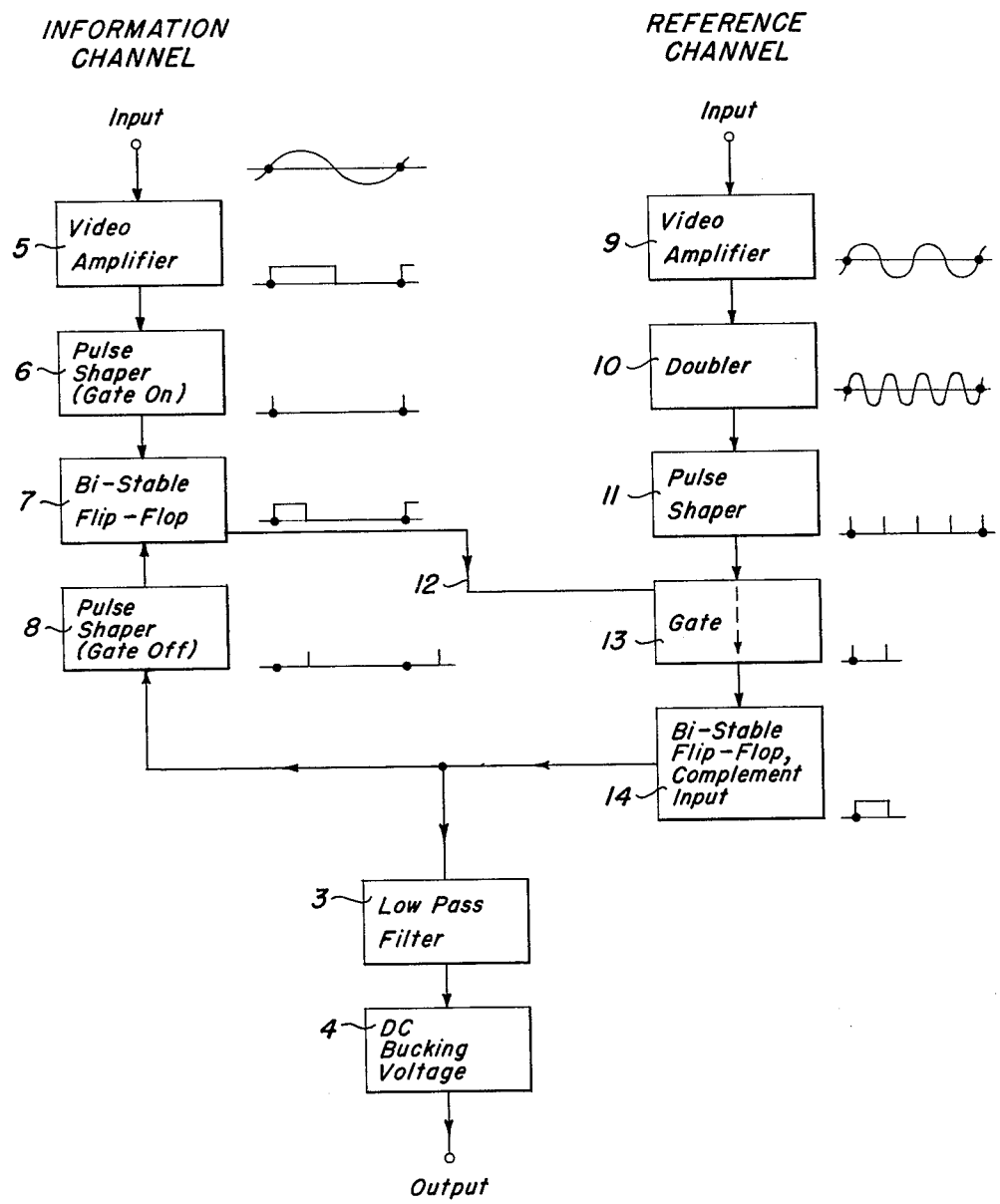
Fig. 3 is a block schematic of the apparatus of the invention used to produce the result indicated in Fig. 2.

Fig. 3 shows a block diagram of the apparatus which makes possible the practical application of the method just described. The reproduced information wave is applied as input to video amplifier 5, similar to the like-designated amplifier of Fig. 1; the wave is clipped as indicated. A 0.1 microsecond pulse is generated by pulse shaper 6 at each positive-going crossover of the wave from amplifier 5.

Following pulse shaper 6 is a bi-stable flip-flop (multivibrator) 7, by which via line 12 a gate 13 is opened. This gate for each cycle of the information wave remains open until closed by a pulse from the reference channel, as will now be explained.

The reproduced reference frequency of nominal 50 kilocycles per second is applied to video amplifier 9 after which it is doubled in frequency by doubler 10. This step is made necessary by the incapacity of the recording head to record a higher frequency than that fed to amplifier 9. By pulse shaper 11 another series of 0.1 microsecond pulses is generated, one at each positive-going crossover of the nominal 100 kc. wave, and these pulses pass through gate 13 while it remains open.

The first pulse from pulse shaper 11 passes through gate 13 and turns on flip-flop 14, similar to flip-flop 7. The second pulse passing through gate 13 turns off flip-flop 14. The result is that in each cycle of the information frequency a square topped pulse appears at the output of flip-flop 14, the amplitude of this pulse being controlled by the setting of flip-flop 14 and the pulse duration being the period of the doubled reference frequency, namely 10 microseconds. It will be understood that the information frequency is lower than the reference frequency, so that a period of the former is more than long enough to allow gate 13 to pass the two pulses corresponding to each cycle of the nominal 100 kilocycle wave from doubler 10. It is arranged that the second pulse passing through gate 13 shall not only turn off flip-flop 14 but at the same time provide a pulse-via-pulse shaper 8 to turn off flip-flop 7 and therewith close gate 13.

Thus in each cycle of the information frequency an area is generated of a nominal 10 microseconds duration. The interval between successive areas is the period of the information wave. Thus the area of the pulse is proportional to the period $T_r$ of the reference frequency, while the "average area" is proportional to $$\frac{T_r}{T_i}$$

or $$\text{Average area } \alpha \frac{T_r}{T_i}$$

or $$\frac{(f_c \pm \Delta f)(1+X)}{f_r(1+X)} = \frac{f_c \pm \Delta f}{f_r}$$

The areas from flip-flop 14 are supplied to low-pass filter 3 and its D. C. component $$\left(\frac{f_c}{f_r}\right)$$

is subtracted by the bucking voltage from block 4; these elements 3 and 4 are the same as in Fig. 1.

It is clear from the above statement of proportionality that wow and flutter are completely excluded from the output of block 4 in Fig. 3.

No more than two of the nominal 100 kilocycle pulses can pass through gate 13 in any one period of the information wave, but it will recognized that while wow and flutter are completely compensated by the system of Fig. 3, there is a randomness of appearance, within the opening of gate 13, of the square-topped wave from flip-flop 14. The period $KT_r$ is a nominal 10 microseconds and may begin at a random instant in the period of opening of gate 13; the area proportional to $T_r$ may begin at any time up to 10 microseconds after the gate is opened. The effect is diagrammatically shown in $b$, Fig. 2. There results a "noise" level which manifests itself in small irregularities in amplitude of the output of the low-pass filter.

Accordingly, it is desirable to arrange that the generated areas, $KT_r$ in duration, shall begin as nearly as possible simultaneously with the opening of gate 13 responsive to a gating voltage on line 12. This can be done to a desired accuracy by the apparatus of Fig. 4.

Referring now to Figure 4, it is seen that numerous elements of the system of Fig. 3 are used, but, intervening between gate 13 and reference area flip-flop 14, additional elements are employed for the purpose of (1) diminishing the randomness of the beginning of the reference area with respect to the opening of gate 13, and (2) making the best use of the information period.

The operation of amplifier 5, pulse shaper 6 and flip-flop 7 in the information channel is the same as in Fig. 3, and likewise used is video amplifier 9 of the reference channel. Reference area flip-flop 14 functions as previously and feeds its output to the same low-pass filter 3 and source 4 of D. C. bucking voltage.

But in order to accomplish the improvement (1) above, doubler 10 is replaced by multiplier 40, which multiplies by 8 the 50-kilocycle reference frequency from amplifier 9. It thereby enables pulse shaper 11, which as before produces a 0.1 microsecond pulse at each crossover of the wave it receives from the preceding element, to produce eight times as many pulses as before in each cycle of the reference frequency. These pulses now occur 2.5 microseconds apart in time, so that the output pulse of flip-flop 14 cannot appear later than 2.5 microseconds after the beginning of the information period. The randomness is reduced by a factor of 4 and a like reduction in noise amplitude is found.

The input information wave is treated as in Fig. 3 to send from flip-flop 7 via line 12 a gating voltage to open gate 13. At the same time the 50-kilocycle reference wave, multiplied to 400 kilocycles by multiplier 40, is fed to pulse shaper 11 which furnishes output pulses at each positive-going crossover of the multiplied reference frequency. These enter gate 13, the first not later than 2.5 microseconds after the gate is opened, and no more than eleven pulses (covering ten cycles of the 400-kilocycle wave) are allowed to pass the gate. The eleventh such pulse, in each period of the information wave, is effective to close gate 13, as will now be described.

The first of these pulses to pass through gate 13 is conveyed by line 15 to delay line 16 (1.4 microseconds delay in a particular case) to turn on reference area 14, the same as in Fig. 3. The pulses from gate 13 pass at the same time over line 17 to pulse shaper 18, where they are converted into 0.4 microsecond pulses and fed to a decade counter, divider 19. This is so arranged that after counting ten pulse intervals an out pulse shall be generated by pulse shaper 20 and sent over line 21 at the same time to cut off flip-flop 7, thereby closing gate 13, and to cut off reference area flip-flop 14, thereby ending the output (in successive periods of the information frequency) which is time-averaged by filter 3, bucked by the voltage from block 4. The reason for delay line 16 in the path of the first pulse is now clear; it allows for the delay caused to the eleventh pulse by the circuits of blocks 18, 19 and 20. The 1.4-microsecond delay was found in a particular installation; other circuits in the path of the eleventh pulse may cause a different delay, and delay line 16 will be appropriately adjusted.

It is clear that the multiplication by 8 and subsequent division by 10 leaves the reference area from flip-flop 14 of greater duration (25 microseconds) than in the system of Fig. 3, and the randomness is reduced. In the diagrammatic illustrations of Fig. 4, where adjacent each block is indicated the wave-shape and relative duration of the corresponding output, the graphic illustration adjacent filter 3 is of the output of flip-flop 14; here it shows that $KT_r$, the reference area, is about 0.6 the duration of the information period.

The sensitivity may be increased by increasing K, which is 1.25 in the sketch of Fig. 4.

Obviously, K may be increased by arranging the decade counter to "divide" by a larger number than 10; that is, allow a greater number of pulses via line 17 to reach ultimately, via line 21, flip-flop 7 and flip-flop 14. Thereby the information period is more fully used, as well as the randomness reduced by multiplier 40. For example, if in the described case divider 19 were arranged to pass to shaper 20 the 16th pulse passing gate 13, the efficiency of use of interval $T_i$ would be 90 instead of 60 per cent, K would be 1.87 instead of 1.25, $f_c$ being in the illustrative case about 25 kilocycles.

The pulse of duration $KT_r$ must, of course, not last longer than $T_i$, and the most suitable arrangement for multiplier 40 and divider 19 will depend on the value chosen for $f_c$; this value is usually one of those standardized by the Research and Development Board. The subjoined table lists the RDB center frequencies with the multiplying and dividing factors considered appropriate for each.

*Multiplication and division used with RDB sub-carrier frequencies*

| Center Frequency (C. P. S.) | Reference Frequency, 50 kc. | |
| --- | --- | --- |
| | Multiply by— | Divide by— |
| 400 | 1 | 40 |
| 560 | 1 | 40 |
| 730 | 1 | 40 |
| 960 | 1 | 40 |
| 1,300 | 2 | 40 |
| 1,700 | 2 | 40 |
| 2,300 | 2 | 40 |
| 3,000 | 4 | 40 |
| 3,900 | 4 | 40 |
| 5,400 | 8 | 40 |
| 7,350 | 8 | 40 |
| 10,500 | 8 | 20 |
| 12,500 | 8 | 20 |
| 14,500 | 8 | 20 |
| 22,000 | 8 | 10 |
| 40,000 | 16 | 10 |
| 70,000 | 16 | 10 |

Figs. 5 and 6 illustrate the application of the system of Fig. 4 to a record on magnetic tape recorded on a commercial instrument to which was attached an eccentric capstan. Simultaneously recorded (on separate heads of the recorder) were a 50-kilocycle reference frequency and (for Fig. 5) an unmodulated carrier, $f_c=22$ kc., while (for Fig. 6) a sawtooth modulator of the carrier through ±7.5 per cent of $f_c$. In each figure, the curve labeled $a$ corresponds to reproduction of the nominally unmodulated (Fig. 5) carrier or the sawtooth modulator (Fig. 6) where the 50-kc. wave on the record itself was not used, being for these runs replaced by a wave of that frequency from an oscillator. Thus each trace $a$ exhibits, as the effect of capstan eccentricity, a 20-cycle-per-second unwanted modulation.

A playback of the same recording, this time with compensation by the recorded 50 kc., yields the curves labeled $b$ in the respective figures. In Fig. 6 the curvature of the sawtooth trace is due to the arc through which travels the recording pen of the Brush recorder.

Figs. 7 and 8 show like results to those of Figs. 5 and 6, respectively, except that $f_c=0.96$ kc. These figures illustrate the success of the system of apparatus of the invention for widely different values of the information frequency. The insignificant residual irregularities in curves $b$ of Figs. 5 and 7 (and later Figs 9 and 10) are believed due to phase shifts in the various elements of the pulse shapers, etc. of Fig. 3 and Fig. 4.

For the production of wow and flutter of higher frequency than 20 cycles per second capstan design is difficult, wherefore to obtain Figs. 9 and 10 there were used electrically simulated variations at 500 and at 25 C. P. S., respectively. In each of Figs. 9 and 10, curves $a$ and $b$ exhibit the reproductions without and with compensation, respectively. The information frequency in both Figs. 9 and 10 was 25 kc.

What is claimed is:

1. For the reproduction of a frequency-modulated information record accompanied by a simultaneously recorded constant frequency record, a system of apparatus comprising means for simultaneously reproducing and independently amplifying the two records, means for multiplying the reproduced constant frequency to be at least greater than the maximum frequency in the information record, means for generating in each period of the information record a voltage pulse of duration equal to an integral number of periods of the multiplied frequency, means including a low-pass filter for averaging the generated pulses and means for canceling from the average the direct current component thereof.

2. For the reproduction of a frequency-modulated information record accompanied by a simultaneously recorded constant frequency record, a system of apparatus comprising means for simultaneously reproducing and independently amplifying the two records, means for multiplying the reproduced constant frequency by a factor making the period of the multiplied frequency not greater than a period of the information record, means for generating in each period of the reproduced information record a voltage pulse of duration equal to an integral number of periods of the multiplied frequency but less than the shortest period of the information record, means including a low-pass filter for averaging the generated pulses and means for canceling from the average the direct current component thereof.

3. A discriminating apparatus for compensating for wow and flutter in reproducing a recorded frequency-modulated information wave simultaneously with which was recorded a constant frequency reference wave, the apparatus comprising a first amplifying means for amplifying the information wave, a second amplifying means for amplifying the reference wave, means for altering in frequency the reference wave, a first generating means for producing voltage pulses at the positive-going crossovers of the information wave, a second generating means for generating voltage pulses at the positive-going crossovers of the altered frequency wave, a gating means enabled by each of the first-named pulses and affording while enabled transmission of the second-named pulses, means for disabling the gating means after transmission of a predetermined number of the second-named pulses of aggregate duration less than the period of the information wave, means for generating in each period of the information wave a voltage pulse of the aggregate duration and means for time averaging the last-named pulses.

References Cited in the file of this patent

UNITED STATES PATENTS

| 2,668,283 | Mullin | Feb. 2, 1954 |
| 2,685,079 | Hoeppnen | July 27, 1954 |